Jan. 6, 1959  H. WELKER ET AL  2,867,727
METHOD AND DEVICE FOR THE SENSING OF NEUTRONS
Filed March 7, 1956  2 Sheets-Sheet 1

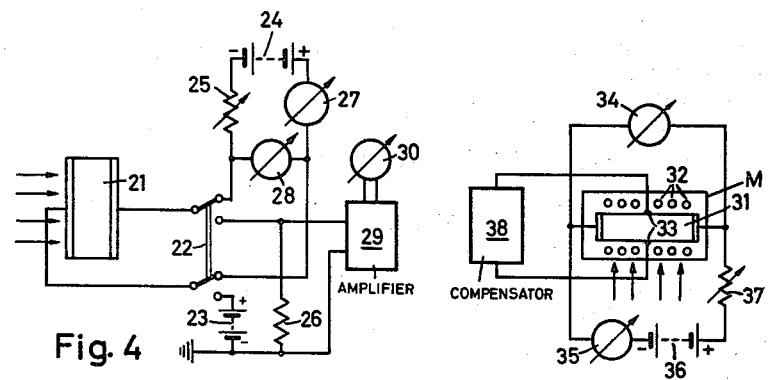
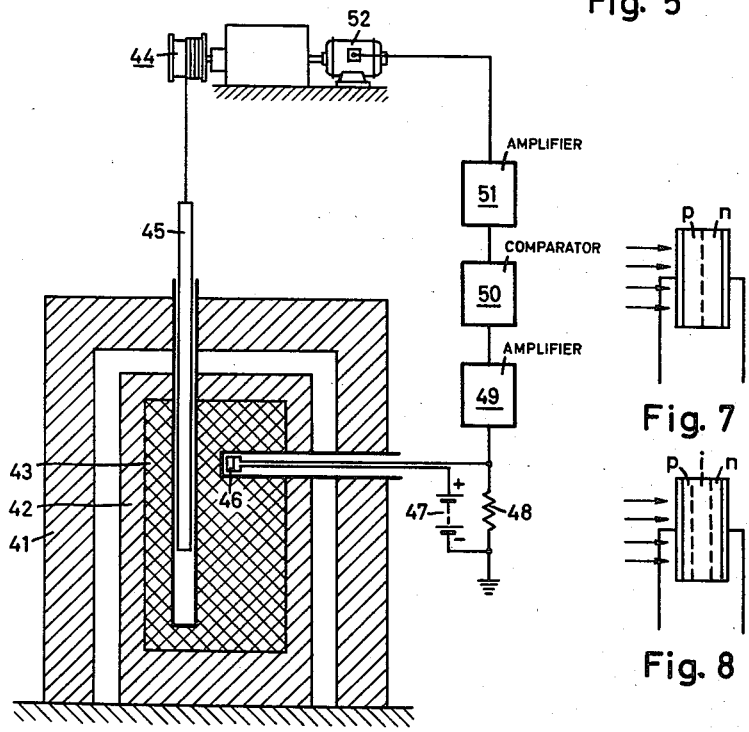

United States Patent Office 2,867,727
Patented Jan. 6, 1959

2,867,727
METHOD AND DEVICE FOR THE SENSING OF NEUTRONS

Heinrich Welker and Rolf Gremmelmaier, Erlangen, Germany, assignors to Siemens-Schuckertwerke Aktiengesellschaft, Berlin-Siemensstadt, Germany, a corporation of Germany Application March 7, 1956, Serial No. 569,997

Claims priority, application Germany March 18, 1955

9 Claims. (Cl. 250—83.1)

The detection of neutrons has gained increasing importance for technological purposes. The methods, originally for use in laboratory, have been perfected and further developed for technological applications. The measuring methods known or proposed for the sensing of neutrons, in the entire energy spectrum of interest, are predicated upon the following physical phenomena: radio activity caused by neutrons; nuclear reactions released by neutrons and resulting in spontaneous emission of a charged particle or gamma quantum; nuclear fission effected by neutrons; ionization of recoil or secondary protons due to neutron-proton scattering.

In use as neutron-detecting devices are: ionization chambers, counter tubes (Geiger counters), scintilloscopes and crystal counters. Also used are photographic emulsions and cloud chambers. With respect to the methods employing such devices the following may be mentioned:

Certain reactions of neutrons with atom nuclei result in the occurrence of radioactive nuclei. This phenomenon is utilized for determining the intensity of a flow of neutrons from the radioactivity of the material being irradiated. The procedure, in principle, involves subjecting the material a certain period of time to the neutron flow and then measuring the resulting radioactivity by instruments generally known for radioactivity measurements such as by means of an ionization chamber, a Geiger counter, scintilloscope or crystal counter. This method, of necessity, always integrates the measured radiation over a time period of radiation. With some reactions, for instance with (n, p)- and (n, α)-reactions, the resulting nuclei differ from the original nuclei relative to their charge and therefore can be separated from the non-converted material with relative ease by chemical methods. In this manner an enrichment in radioactive nuclei and hence an increase in measuring accuracy is possible. With (n, γ)-reactions, however, there result isotopes of the original nuclei. A separation of these nuclei is possible on the basis of the recoil to which they are subjected by the emission of gamma rays. This method has become known as the "Szilard-Chalmers reaction."

The detecting methods that directly utilize neutron reactions are predicated upon determining the ionization of the emitted charged particles. Used for measuring the ionization are the detecting methods already mentioned above. For instance, for detection of slow and thermal neutrons, the $B^{10}$ (n, α) $Li^7$ reaction is preferably used because the action cross section for this reaction is relatively very large. In practice, the procedure is to use boron in the counter tube or ionization chamber as a gaseous atmosphere in the form of $BF_3$ or by coating a thin layer of boron onto the chamber walls. Since the cross section of this reaction decreases with increasing neutron velocity, it is customary to enclose the measuring device in a paraffin jacket for decelerating the neutrons if neutrons of medium and fast velocities (about 10 k. e. v. to about 3 m. e. v.) are involved. Due to collision with hydrogen nuclei, the neutrons lose energy within the paraffin and can be detected as slow neutrons in the above-described manner.

In electric circuit devices for the counting of individual impulses, the above-described arrangements operate to either measure all impulses that exceed a given minimum magnitude or all impulses whose magnitudes are between two given limit values. This permits measuring neutron quantities even in the presence of a strong background of gamma radiation.

The known neutron detecting methods that are based upon utilization of nuclear fission released by the neutrons, operate by measuring the ionization of the fission products. The fissionable nuclei are inside the chambers either as a constituent of the gaseous chamber atmosphere (for instance $UF_6$) or as a constituent of a thin surface coating, for instance of uranium oxide. Suitable for the detection of thermal neutrons are $U^{233}$, $U^{235}$ or $Pu^{239}$. Suitable for fast neutrons is uranium either as occurring in nature or enriched by $U^{238}$.

The method most commonly used for the detection and measuring of fast neutrons is predicated upon measuring the ionization of the recoil protons occurring due to scattering of neutrons colliding with protons. This method has the disadvantage that the energy of the recoil protons in the range of the scattering angle varies between zero and the amount of the neutron energy.

Recently scintilloscopes and crystal counters have gained importance as neutron detecting devices. Special methods have been developed for the entire energy spectrum of interest. Thus, for instance for the detection of fast neutrons, a scintillation counter using organic phosphorus substances has become known. In this method also, the ionization of the recoil protons resulting from neutron-proton scattering is utilized for neutron detection, the high hydrogen contents of the phosphorus substances being advantageous for this purpose.

In a method for the sensing of neutrons of medium and small energies, the above mentioned $B^{10}$ (n, α) $Li^7$ is utilized, or rather the fact that this reaction, with low and medium energies, results in an excited $Li^7$ nucleus which, with emission of gamma radiation, converts into the fundamental condition. This gamma radiation is measured by a scintillation counter.

For the detection of thermal neutrons with the scintillation counter, an LiI (Tl) crystal is used, and the scintillations produced by the alpha- and $H^3$-particles in the reaction $Li^6$ (n, α) $H^3$ are measured. Furthermore, a LiBr/AgBr crystal counter utilizing the same reaction has been proposed for the detection of slow neutrons. A disadvantage of such a crystal counter is the fact that it can be operated only at low temperature and that disturbing polarizing phenomena occur during operation.

Neutron reactions in which a particle is spontaneously emitted can also be utilized for neutron measuring purposes by having the charged corpuscles act from the outside upon the scintillator.

The often-used detection of neutrons with the aid of photographic emulsions and cloud chambers is suitable particularly for the detection of individual events. The neutron detection by these methods is again effected indirectly in response to charged particles released or affected by the neutrons.

The detecting or sensing devices based upon the above-mentioned methods have the disadvantage of being relatively large, and some of them require a considerable expenditure in equipment. When using gas-filled ionization chambers and counter tubes, the dimensions for good efficiency, must at least have the size of the reciprocal absorption coefficient. For instance, for detection of slow neutrons in a $BF_3$ chamber under atmospheric pressure, a length of approximately 50 cm. is required. If instead of the $BF_3$ atmosphere a boron coating on the inner walls is used, the dimensions can be somewhat reduced; but, because of the slight active range of the alpha radiation, the boron coating must be very thin. This has the consequence that the absorption of neutrons is slight so that the efficiency of the counter tube is likewise slight.

While scintillation counters have the advantage that for good efficiency only relatively small detectors are needed, the required photomultiplier involves a disagreeable additional expenditure in equipment which obviates the benefit of the small size of the detector as such. Relatively small detectors are also obtained when using crystal counters. However, as mentioned, the LiBr/AgBr crystals heretofore used are operable only at low temperatures and involve disturbing polarization effects.

It is an object of our invention to provide a device for the sensing and measuring of neutrons which eliminates or greatly minimizes the above-mentioned disadvantages of the devices heretofore available.

To this end, and according to a feature of our invention, we provide a crystal-type neutron detector in which the crystal is formed of a semiconductor body consisting of a semiconducting compound of the type $A_{III}B_V$ containing boron and/or nitrogen. That is, the crystalline body in the counter consists of a binary compound of an element from the third group of the periodic system with an element of the fifth group of the periodic system, and this compound contains among its constituent elements either boron or nitrogen or both. According to the invention, the change in electric properties of the semiconductor compound body, due to the nuclear reactions released by the neutrons, is utilized for detecting the neutrons.

Particularly suitable for the purpose of the invention are semiconductor bodies formed of a compound of the element boron (B) with one of the elements nitrogen (N), phosphorus (P), arsenic (As) or antimony (Sb), and semiconductor bodies of a compound of the element nitrogen (N) with one of the elements aluminum (Al), gallium (Ga) or indium (In). Semiconducting compounds of this type are disclosed in detail in the copending application Serial No. 275,785 of H. Welker, now Patent 2,798,989, assigned to the assignee of the present invention. In devices according to the present invention, the sensing effect, that is the electric parameter change in the semiconductor compound, is due to nuclear reactions released by the neutrons and resulting in spontaneous emission of a charged particle. This effect comprises the reactions in which the charged particle is emitted with an extremely slight half-life, namely a half-life period below $10^{-4}$ second, preferably below $10^{-8}$ second.

The invention will be further explained with reference to the drawings in which:

Fig. 4 shows the circuit diagram of a device for detection of single events as well as of an integrated flow of neutrons.

Fig. 5 shows a circuit diagram of a neutron detector utilizing the Hall effect.

Fig. 6 illustrates schematically a nuclear reactor controlled by a neutron detector according to the invention.

Figs. 7 and 8 illustrate two semiconductor junctions, respectively, as applicable for the purposes of the invention.

Figure 1:
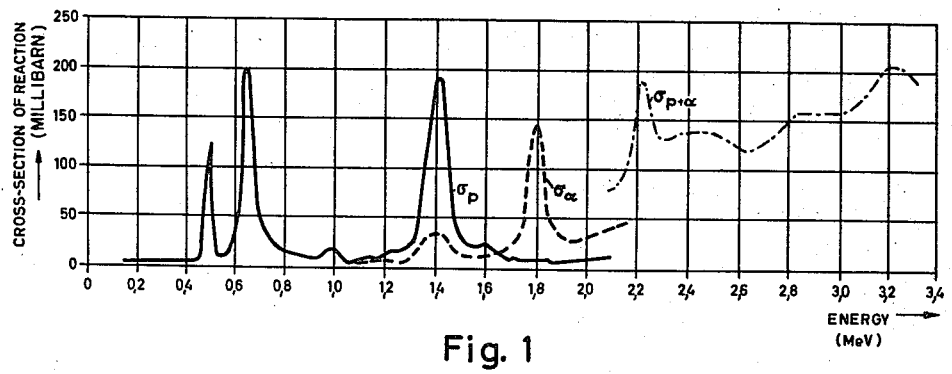
Fig. 1 is a coordinate diagram representing the action cross section for two nuclear reactions of nitrogen of interest for the present invention.

When applying semiconducting boron compounds according to the invention, use is made of the $B^{10}$ $(n,\alpha)Li^7$ reaction already utilized in the known neutron detecting devices. When such a semiconductor body is subjected to a thermal or slow neutron radiation, the following phenomena take place:

(A) In accordance with the just-mentioned reaction, the boron atom is converted into lithium accompanied by spontaneous emission of an alpha particle with an energy of 2.3 m. e. v. The active cross-section of this reaction, for instance for thermal neutrons, amounts to approximately 3990 barns (1 barn=$10^{-24}$ cm.²), provided pure $B^{10}$ is used, but is only about 710 barns when using the natural isotope mixture. In comparison, the cross-section of the reaction $Li^6(n,\alpha)H^3$ utilized in the known LiBr/AgBr crystal counters is only about 70 barns.

Since, as mentioned above, the action cross-section of the $B^{10}(n,\alpha)Li^7$ reaction decreases with increasing neutron energy, the crystal is embedded in paraffine for the detection of higher-energy neutrons, the neutrons being retarded in the paraffine by collision with H-nuclei.

The average penetrating depth $d$ of the neutrons is calculated, as known, from the absorption coefficient $\mu$ according to the equation $$d = \frac{1}{\mu} = \frac{1}{N \cdot \sigma}$$

N denotes the number of the absorbing atom nuclei per cm.³; $\sigma$ denotes the cross-section of the reaction. For instance, the number of the boron nuclei in boron phosphide is $4.35.10^{22}$ cm.$^{-3}$. With the above-mentioned cross-section of the $B(n,\alpha)Li^7$ reaction of 710 barns, there results for neutrons of an energy of 0.025 e. v. a penetrating depth of $d=3.24.10^{-2}$ cm.

(B) As mentioned, the alpha particle emitted during the $B^{10}(n,\alpha)Li^7$ reaction has an energy of 2.3 m. e. v. and thus has within the boron compound an active range of some $10^{-4}$ cm. By imparting energy to the electrons of the semiconductor body the alpha particle produces numerous electron-hole pairs. This changes the electric properties of the semiconductor body; and this electric parameter change of the semiconductor body is utilized in the device according to the invention for detecting the neutrons. This can be done, for instance, by measuring the current-voltage pulse which is released by the electron-hole pairs produced by the alpha particles in the semiconductor body.

(C) As a result of neutron capture, the $B^{10}$ nucleus is converted into an $Li^7$ nucleus. The latter forms in the fundamental lattice of the semiconducting boron compounds a defection point which in turn can produce a movable charge carrier i. e. an excess electron or a defect electron (hole). This process, in contrast to the instantaneous and reversible change described under (B) which rapidly decays by recombination of the electron-hole pairs in dependence upon their lifetime and also by the flow of current in the exterior circuit, produces an irreversible change in electric properties of the semiconductor crystal. The process, therefore, is particularly suitable for determining the total number of the neutrons captured within a given interval of time without requiring additional integrating mechanisms. It is possible, particularly, to realize this effect as well as the one described under (B), that is instantaneous detection of individual events and time-integrating detection of a neutron flow, within one and the same sensing device.

With respect to the boron compounds to be used according to the invention, the following is of interest:

The $A_{III}B_V$-compounds of boron, generally, possess a relatively large width of the forbidden zone. As a consequence, these compounds in the condition of intrinsic conductance are very poor conductors of electricity; and, according to experience, these compounds are then also poor conductors in the range of defection conductance, that is when they are doped with impurity atoms. This is disadvantageous for some applications because electric charging phenomena may aggravate the stationary operation of the neutron-responsive device. However, by suitable choice of the $B_V$ component it is possible to adapt the width of the forbidden zone and thus the electric resistance of the particular boron compound to any particular requirements. Thus, for instance, in the sequence BN, BP, BAs, BSb, the width of the forbidden zone decreases consecutively and hence the electric conductance increases accordingly. Besides, the defect-electron mobility (hole mobility) in the $A_{III}B_V$ compounds counteracts the disturbing formation of a space charge. In contrast, the AgBr/LiBr crystals heretofore used do not possess appreciable defect-electron mobility and hence do not offer the just-mentioned advantage. They also are not amenable to the further advantage of the $A_{III}B_V$ compounds of permitting the application of p-n and p-i-n techniques requiring doping of the crystal with donors and acceptors.

In this connection it is further of interest that the functioning of the device according to the invention is fundamentally different from the known method for the detection of alpha particles with the aid of p-n crystals. According to the latter method, alpha particles are shot into the crystal, whereas, as explained above, it is just one of the important advantages of the device according to the invention as compared with those previously known to have the alpha particles generated and directly effective in the interior of the semiconductor crystal.

For the technical production of semiconductor devices according to the invention, it is of importance that the $A_{III}B_V$ compounds of boron are physically and chemically more favorable than the element boron. Boron, though also possessing semiconducting properties, is technologically a difficult substance. Indeed, so far the crystalline structure of the element boron has not become definitely known. The carrier mobility of elemental boron must be considered to be so extremely slight that this element is not suitable as a semiconductor for technical purposes. However, the boron compounds, particularly those of the type $A_{III}B_V$, are better known and their properties, such as lattice constants and crystal structure, are known to a large extent. Besides, the $A_{III}B_V$ compounds of boron are very stable and can be better manipulated technologically than the element boron.

Another important effect achieved by semiconductor devices according to the invention resides in the fact that the alpha particles released, for instance, by thermal neutrons, i. e. neutrons with an energy content of approximately 0.025 e. v., have an energy of 2.3 m. e. v. which is several orders of magnitude higher than the energy of the releasing neutrons. Since the kinetic energy of these alpha particles can be converted at useful efficiency (for instance 1%) into electric energy in the semiconductor crystal, the conversion of neutron energy into electric energy involves a considerable power amplification. In the just-mentioned example the amplification factor amounts to about $10^6$. The energy required therefor originates from the nuclear reaction.

As mentioned, aside from boron compounds of the type $A_{III}B_V$, the nitrogen compounds of the same type are likewise applicable for the purposes of the invention. With nitrogen compounds the following reactions are utilized:

$N^{14}(n,p)C^{14}$ for slow and medium-velocity neutrons,
$N^{14}(n,\alpha)B^{11}$ for fast neutrons.

The action cross-section for these two reactions in dependence upon the neutron energy is apparent from the diagram of Fig. 1. The abscissa denotes the energy of the neutrons in m. e. v., the ordinate indicates the action cross-section in Millibarn. Three curves are represented, namely a curve $\sigma p$ for the (n,p) reaction, a curve $\sigma \alpha$ for the (n,$\alpha$) reaction, and a curve $\sigma p+\alpha$ for the sum of the cross-sections of both reactions at high energy values.

The cross-section of the $N^{14}(n,p)$ reaction for thermal neutrons amounts to 1.76 barn. Although this value is smaller by the factor 400 than the cross-section of the B(n,$\alpha$) reaction for thermal neutrons, the smaller cross-section of the $N^{14}(n,p)$ reaction is favorable for response to very large flows of neutrons because in this case correspondingly fewer nuclear conversions occur so that the lifetime of the crystal is correspondingly longer. Particularly favorable for this purpose are the compounds aluminum nitride (AlN) and gallium nitride (GaN) since the cross-section of Al and Ga for nuclear conversion excited by thermal neutrons, i. e. the (n,$\gamma$) process, is likewise small. This action cross-section for thermal neutrons in the Al(n,$\gamma$) reaction amounts to 0.22 barn and in the Ga(n,$\gamma$) reaction to 2.9 barns. The nuclei resulting from these two reactions are beta and gamma radiators. Produced by these reactions are the elements silicon (Si) and germanium (Ge) respectively with a half-life of a few minutes.

Like the borides, the nitrides in devices according to the invention are employed for detecting the neutrons by the neutron-released reversible and irreversible changes of the electric properties of the semiconductor body. Reversible changes result from the electron-hole pair formation caused by the alpha particles or protons spontaneously emitted from the nitrogen nuclei under the effect of the neutrons. The irreversible changes result from the conversion of nitrogen nuclei into carbon nuclei in the (n,p) reaction. These $C^{14}$ nuclei form lattice defection points in the basic crystal lattice of the semiconducting nitrogen compound, which defection points may form movable charge carriers. To be considered also are the additional lattice defection point and the associated changes in the electric properties of the semiconductor body resulting from the previously mentioned Al(n,$\gamma$) and Ga(n,$\gamma$) reactions, these additional defection points being formed by the element silicon or germanium.

The relatively large action cross-section of nitrogen for neutrons of medium and large energy makes the nitrogen compounds particularly suitable for the detection of neutrons within this energy range, whereas the boron compounds are preferably used for the detection of slower neutrons. Like the borides, the nitrides have the advantages, generally inherent in $A_{III}B_V$ compounds, of being amenable to the p-n and p-i-n techniques. In addition, the nitrides are technologically even more favorably applicable than the borides.

The qualitative or quantitative detection of flaws of neutrons as manifested by the change in electric properties of the semiconductor body can be realized by electric circuit diagrams in a variety of ways.

Figure 2:
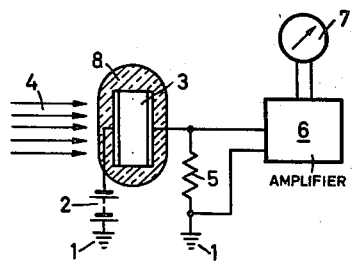
Fig. 2 shows schematically an example of a circuit diagram for the instantaneous detection of neutrons.

Fig. 2 shows an example of such a device for determining the instantaneous value of a neutron flow. The device is grounded at 1 and is energized from a voltage source 2. The semiconductor body 3, consisting of an $A_{III}B_V$ boride or nitride, forms a variable resistor in the energizing circuit and, during operation of the device, is subjected to a flow of neutrons represented by a group of arrows 4. Denoted by 5 is a resistor, by 6 an amplifier, and by 7 a measuring instrument. The semiconductor 3 is shown enclosed by a jacket of paraffin for decelerating the neutrons. The neutrons impinging upon the semiconductor body and penetrating into its interior release nuclear reactions, and the spontaneously emitted charged particles resulting from these reactions form electron-hole pairs. These pairs produce in the semiconductor device a voltage kick which is amplified in the amplifier 6 and indicated by the instrument 7. When suitably calibrating the instrument 7, the instantaneous value of the neutron flow can be directly read off. The electric parameter changes responded to by the device are based upon the phenomena explained above under (B). These changes are instantaneous and reversible since, upon recombination of the electron-hole pairs the semiconductor crystal virtually has the same conductance as prior to the incidence of neutrons.

Figure 3:
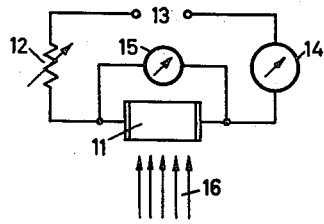
Fig. 3 shows a schematical circuit diagram of a device for response to the time integral of a flow of neutrons.

A simple device for indicating the integral value of a neutron flow over a given period of time is illustrated in Fig. 3. Denoted by 11 is the boride or nitride semiconductor body, by 12 an adjustable series resistor, by 13 a voltage source, by 14 a current measuring instrument and by 15 a voltage measuring instrument. A neutron flow acting upon the semi-conductor body is represented by arrows 16. This device responds to the irreversible change of the electric properties of the semiconductor caused by the neutrons, utilizing the occurring resistance change of the semiconductor body. This resistance change can be measured in two ways. One way is to keep the current through semiconductor body 11 constant and to read off, at instrument 15, the neutron-dependent change in voltage drop across member 11. The other way is to keep that voltage drop constant and to read off, at instrument 14, the change of current in member 11. In both cases the required current or voltage constancy is obtained by setting the resistance of resistor 12 accordingly. Suitably calibrated, the device 14 or 15 indicates at any moment the integrated value of the neutron flow.

Measuring circuits of the type shown in Figs. 2 and 3 can be combined with each other so that the device, equipped with a single boride or nitride semiconductor crystal or with two such crystals, is suitable for response to individual events as well as for measuring a time-integrated flow of neutrons. It is further preferable to provide such a device with a selector switch, for instance as used in the embodiment of Fig. 4 and described presently.

According to Fig. 4, a boride or nitride semiconductor crystal 21 to be subjected to a flow of neutrons, is connected through a selector switch 22 with two measuring networks. One of these networks comprises a grounded current source 23, a resistor 26, an amplifier 29 and a measuring instrument interconnected and operative as illustrated in Fig. 2 and described in the foregoing. The second measuring network comprises a current source 24, a resistor 25, a voltmeter 28 and an ammeter 27 interconnected and operative in the same manner as the components of the circuit shown in Fig. 3 and described above. The switch 22 is shown set for measuring a time-integrated value of the flow of neutrons. It may be mentioned that in devices according to Figs. 3 and 4 for measuring the integral value of the flow of neutrons, there may occur the possibility that, when the neutron intensities are large, the instantaneous reversible effects become greatly preponderant to, and overshadow the integral irreversible effects. In such case, the semiconductor body for measuring the integral effect must be taken out of the flow of neutrons, and the operation must then be carried out with the device according to Fig. 3 or with the selective switch 22 of Fig. 4 placed into the illustrated position.

The device illustrated in Fig. 5 is largely similar to that of Fig. 3, differing therefrom only by the fact that aside from measuring the resistance change effected in the semiconductor body by the neutrons, the resulting Hall effect is also utilized for measuring purposes. According to Fig. 5 of the semiconductor crystal 31 of an $A_{III}B_V$ boride or nitride, subjected to a flow of neutrons, is connected with a voltage measuring instrument 34, a current measuring instrument 35 and a current source 36, the latter being connected in series with an adjustable resistor 37. In this respect the device is identical with that described above with reference to Fig. 3. However, the semiconductor crystal 31 is also subjected to a magnetic field whose lines of force are perpendicular to the axis of current flow and perpendicular to the plane of illustration, some points at which the field passes through the plane of illustration being schematically indicated at 32. The field is shown produced by a magnet whose pole face is schematically shown at M. The semiconductor crystal is provided with two Hall electrodes 33 which are located on equi-potential points when the magnetic field strength is zero. However, when the magnetic field is effective, a voltage difference, the so-called Hall voltage, appears across electrodes 33 and this voltage is measured by a measuring device 38 preferably operating on the compensator principle. That is, an auxiliary voltage in device 38 is compared with the Hall voltage, and the difference between the compensating voltage and the Hall voltage is set to the zero value so that the degree of voltage setting in instrument 38 is indicative of the value of the Hall voltage. The flow of neutrons is schematically indicated by arrows.

The operation of the device is based upon the fact that the Hall voltage is inversely proportional to the charge-carrier concentration in the semiconductor body. As a primary or secondary effect of the neutron radiation entering into the semiconductor body, the electron or hole concentration is varied, and this variation manifests itself not only by a change in electric conductance measured by instruments 34 and 35, but also by a change in Hall voltage measured by the compensator 38. Such a device is suitable for determining integral effect, as well as instantaneous events due to neutrons. However, as explained above, the instantaneous changes in carrier concentration may overshadow the variations caused by the nuclear reactions so that, when the neutron flow is of high intensity, essentially instantaneous events are responded to only. Consequently, in the event of such a neutron-flow intensity, the semiconductor body for integrating measuring should be taken out of the flow of neutrons.

The regulating system shown in Fig. 6 operates on the principle of Fig. 2 for controlling the neutron flow in a nuclear reactor. The reactor comprises a shield 41, a graphite reflector 42, a uranium-graphite charge 43, and control rods 45 of cadmium. The reactor is equipped with a neutron detector according to the invention. This detector comprises a boride or nitride semiconductor body 46 as explained above, which is connected to a current source 47 through a resistor 48. The resistance variations, or rather the corresponding changes in voltage drop, are impressed upon an amplifier 49. The amplified output current is compared in a comparator 50 with a selected datum voltage, and the difference voltage, amplified by an amplifier 51, is applied to an electric drive 52 which by means of a cable drum 44 raises and lowers the cadmium rods 45. The operation of the sensing device, composed of circuit components 46, 47 and 48 is essentially as described above with reference to Fig. 2.

In general, the devices according to the invention, as compared with those previously known, have the advantage that the particles spontaneously emitted under the influence of the neutrons are sensed directly at the location at which they originate. It is therefore not necessary to adapt the thickness of the semiconductor crystal to the relatively very small action range of the alpha particles as is required, for instance, for the dimensioning of the boron coating on the inner wall of counter tubes. This has the further advantage that the semiconductor body can be so dimensioned that practically all neutrons are absorbed. Considering for instance the above-mentioned depth of penetration for 0.025 e. v. neutrons of $3.24 \cdot 10^{-2}$ cm., it will be recognized that very small dimensions of the semiconductor body are sufficient. For example, a BSb semiconductor body used in any of the devices described in the foregoing may have a prismatic shape of one cm. length, one cm. width and 0.5 mm. thickness. Generally the use of monocrystals is preferable but not always necessary.

Suitable as electrode materials for the boride and nitride semiconductor compounds to be used according to the invention, for instance for a BSb semiconductor body, are indium or gold. The indium electrodes may be vaporized or fused onto the semiconductor body. Gold electrodes are preferably deposited by vaporization. As mentioned, the boride and nitride bodies may be doped with impurity atoms. Suitable for doping are for instance the elements Zn, Cd, Hg for producing p-type conductance. The elements S, Se, Te are suitable for producing n-type conductance.

It is assumed in the foregoing description of the illustrated embodiments that the semiconductor bodies are barrier-free, consisting throughout of boride or nitride material of the same type of conductance. However, as mentioned, the known p-n and p-i-n techniques are applicable. In other words, semiconductor bodies with barrier layers or intermediate layers are likewise applicable for the purposes of the invention. Fig. 7, for instance, shows a boride or nitride semiconductor component, applicable in any of the afore-described devices, which comprises a p-n junction. Similarly, Fig. 8 illustrates an applicable semiconductor member forming a p-i-n junction. That is, a semiconductor body according to Fig. 8 has a middle zone i which has intrinsic conductance, whereas the outer zones are highly doped to exhibit p-type and n-type conductance respectively. The conductance of such semiconductor bodies is asymmetrical, but is affected by neutron-released nuclear reactions in substantially the same manner as explained in the foregoing with reference to barrier-free semiconductors.

It will be understood from the foregoing that devices according to the invention can be modified in various ways and are generally applicable for response to neutrons such as for the detection of neutrons, the measuring of neutron energies or neutron-flow intensities and for a combination of such measurements; also for the control and regulation of a neutron flow or of other physical magnitudes causing or modifying such a neutron flow, the operation of the device in each case being based upon utilization of the neutron-responsive change of the electric properties in semiconducting boride or nitride body of the device according to the invention.

We claim:

1. In combination with a source of neutrons, a neutron sensing device comprising a crystalline semiconductor body responsive to the flow of neutrons from said source when in operation and consisting essentially of a semiconductor compound of the type $A_{III}B_V$ wherein $A_{III}$ is and element from the third periodic group of elements and $B_V$ is an element from the fifth periodic group, said compound containing as one of its constituent elements a substance selected from the group consisting of boron and nitrogen, an electric circuit including said semiconductor body and having a current source connected with said body, and output means connected with said circuit, said semiconductor body forming, during sensing operation of the device, the only condition-responsively variable component of said circuit so that said output means responds to electric parameter change caused in said body due to incidence of neutrons.

2. The device according to claim 1, wherein said semiconductor body has one and the same type of conductance throughout.

3. The device according to claim 1, wherein said semiconductor body comprises a barrier junction so as to have asymmetrical electric conductance.

4. A neutron sensing device, comprising a crystalline semiconductor body exposed to flow of neutrons when in operation and consisting essentially of a crystalline compound selected from the group consisting of BN, BP, BAs, BSb, AlN, GaN, InN, a hydrogen-atom substance enclosing said body for deceleration of incoming neutrons, an electric circuit including said semiconductor body and having a current source connected with said body, and output means connected with said circuit, said semiconductor body forming a condition-responsive component of said circuit so that said output means responds to electric parameter change caused in said body due to incidence of neutrons.

5. A neutron sensing device, comprising a crystalline semiconductor body exposed to flow of neutrons when in operation and consisting essentially of a crystalline compound selected from the group consisting of BN, BP, BAs, AlN, GaN, InN, a grounded measuring circuit having a source of constant voltage and a normally constant resistance connected in series with each other and in series with said body, and electric measuring means connected across a resistive portion of said circuit for response to electric conductance change in said body indicative of instantaneous nuclear events caused by neutrons.

6. A neutron sensing device, comprising a crystalline semiconductor body exposed to flow of neutrons when in operation and consisting essentially of a crystalline compound selected from the group consisting of BN, BP, BAs, BSb, AlN, GaN, InN, and a time-integrating measuring circuit having a current source and adjustable resistance means connected in series with each other across said body and comprising measuring means responsive to the integral, over a given timing period, of a neutron-responsive electric change of said body.

7. A neutron sensing device, comprising a crystalline semiconductor body exposed to flow of neutrons when in operation and consisting essentially of a crystalline compound selected from the group consisting of BN, BP, BAs, BSb, AlN, GaN, InN, and an electric network having current supply means connected to said body, said network comprising electric measuring means responsive to instantaneous electric effects caused in said body by incidence of neutrons and integrating means responsive to the integral of such effects over a given period of time.

8. A neutron sensing device, comprising a crystalline semi-conductor body exposed to flow of neutrons when in operation and consisting essentially of a crystalline compound selected from the group consisting of BN, BP, BAs, BSb, AlN, GaN, InN, said body having Hall electrode means, an electric circuit including said body and having a current source of normally constant voltage, magnetic field means having in said body a normally constant field transverse to the flow direction of the current from said source, said body, when exposed to flow of neutrons, being substantially the only condition-responsive component of said circuit, and voltage measuring means connected to said Hall electrode means for response to electric change in said body due to said flow of neutrons.

9. With a source of a flow of neutrons having regulating means upon whose regulating operation the neutrons flow is dependent, the combination of a neutron sensing device comprising a crystalline semiconductor body exposed to the flow of neutrons from said source when in operation and consisting essentially of a semiconductor compound of the type $A_{III}B_V$ wherein $A_{III}$ is an element from the third periodic group of elements and $B_V$ is an element from the fifth periodic group, said compounds containing as one of its constituent elements a substance selected from the group consisting of boron and nitrogen, an electric circuit including said semiconductor body and having a current source connected with said body, and output means connected with said circuit, said semiconductor body forming a condition-responsive component of said circuit so that said output means responds to electric parameter change caused in said body due to incidence of neutrons, and control circuit means connecting said output means with said regulating means for controlling the latter in dependence upon said change.

References Cited in the file of this patent

UNITED STATES PATENTS

| | | |
|---|---|---|
| 2,564,626 | MacMahon et al. | Aug. 14, 1951 |
| 2,745,284 | Fitzgerald et al. | May 15, 1956 |
| 2,753,462 | Moyer et al. | July 3, 1956 |